United States Patent
Andersson et al.

(10) Patent No.: US 6,909,369 B2
(45) Date of Patent: Jun. 21, 2005

(54) DEVICE FOR MONITORING AN AREA

(75) Inventors: Roine Andersson, Knutby (SE); Olof Eriksson, Alvsjo (SE)

(73) Assignee: Saab AB, Linkoping (SE)

( * ) Notice: Subject to any disclaimer, the term of this patent is extended or adjusted under 35 U.S.C. 154(b) by 8 days.

(21) Appl. No.: 10/332,272

(22) PCT Filed: Jun. 28, 2001

(86) PCT No.: PCT/SE01/01485
§ 371 (c)(1),
(2), (4) Date: Jun. 30, 2003

(87) PCT Pub. No.: WO02/04980
PCT Pub. Date: Jan. 17, 2002

(65) Prior Publication Data
US 2004/0032362 A1 Feb. 19, 2004

(30) Foreign Application Priority Data
Jul. 7, 2000 (SE) ................................................ 0002564

(51) Int. Cl.$^7$ .......................... G08B 13/18; B60Q 1/00; G08G 1/01
(52) U.S. Cl. .................. 340/554; 340/436; 340/933
(58) Field of Search ................. 340/554, 436, 340/933

(56) References Cited

U.S. PATENT DOCUMENTS

| | | | |
|---|---|---|---|
| 3,947,834 A | 3/1976 | Gershberg et al. | |
| 4,224,607 A | * 9/1980 | Poirier et al. | 340/552 |
| 4,612,536 A | 9/1986 | Harman | |
| 5,157,393 A | * 10/1992 | Fox et al. | 340/870.3 |

FOREIGN PATENT DOCUMENTS

| | | | | |
|---|---|---|---|---|
| GB | 2328083 A | 2/1999 | | |
| GB | 2328083 | 2/1999 | | |
| JP | 07325149 | 12/1995 | | |
| JP | 07-325149 | 12/1995 | | |
| JP | 09-133765 | 5/1997 | | |
| JP | 10096774 A | * 4/1998 | ........... G01S/13/93 | |

* cited by examiner

Primary Examiner—Jeffery Hofsass
Assistant Examiner—Lam Pham
(74) Attorney, Agent, or Firm—Connolly Bove Lodge & Hutz LLP; Myron K. Wyche

(57) ABSTRACT

The present invention relates to a monitoring device (1) with a transmitter unit (2) and a receiver unit (3) for monitoring an area. Slotted cables serve as antennas. According to the invention, a first slotted cable is arranged as a transmitting a antenna (4) for transmitting a pulsed high-frequency signal and a second slotted cable is arranged as a receiving antenna (9) for receiving the reflected signal. The slotted cables are arranged in association with each other and essentially parallel to each other, and the transmitter unit (2) is connected to the first slotted cable at one end of the antenna arrangement and the receiver unit (3) is connected to the second slotted cable at the other end of the antenna arrangement.

20 Claims, 3 Drawing Sheets

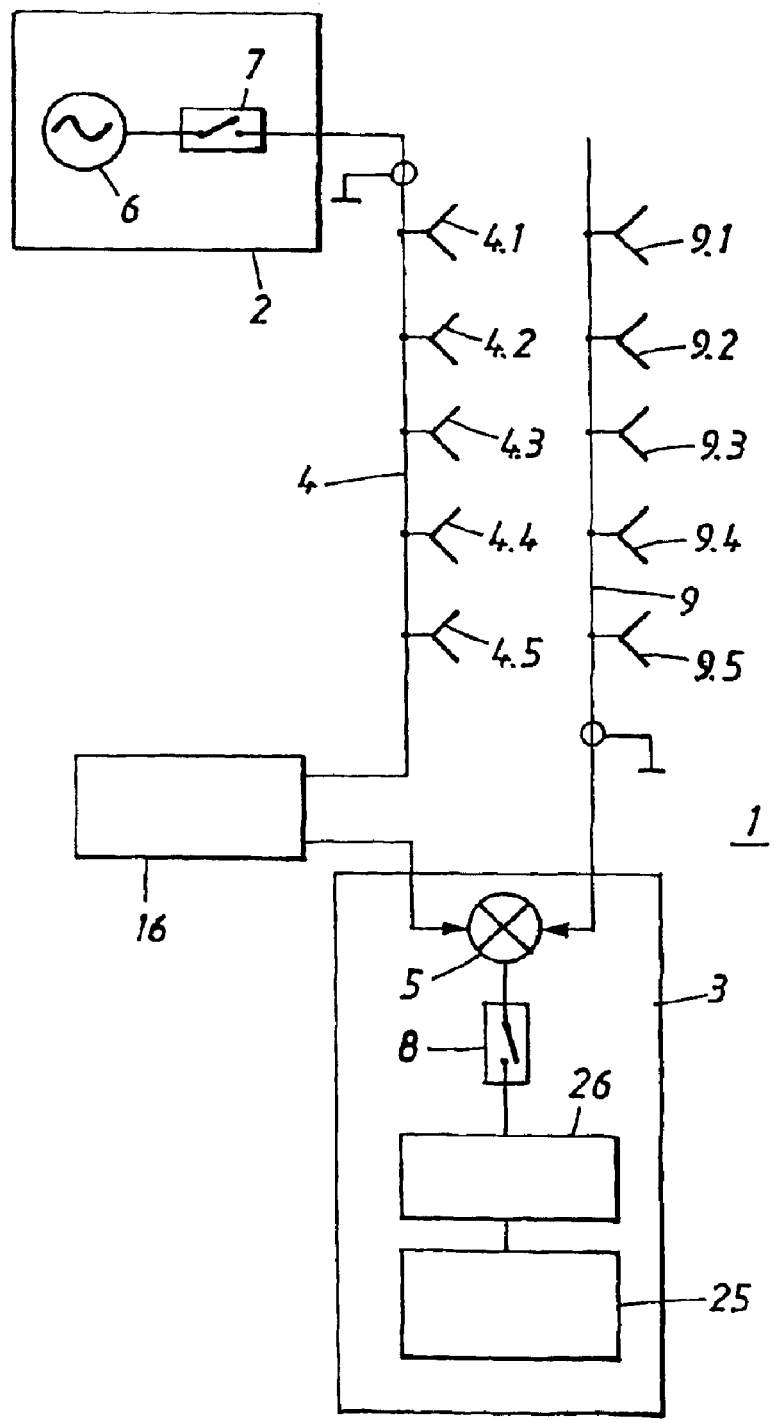

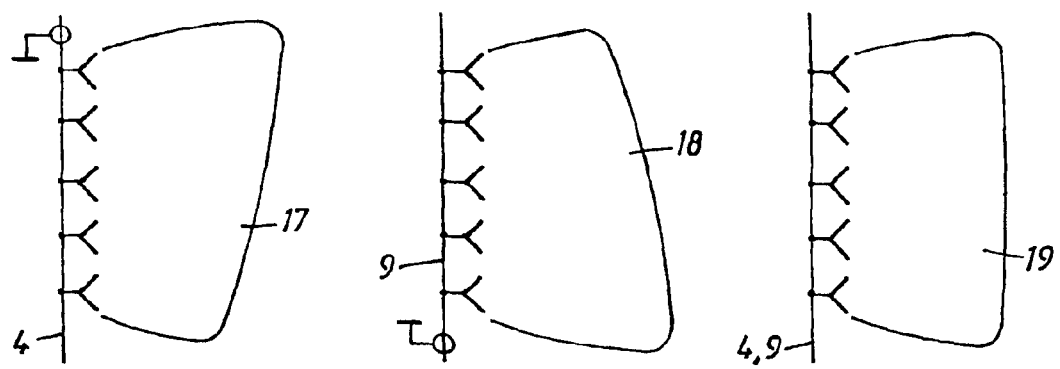
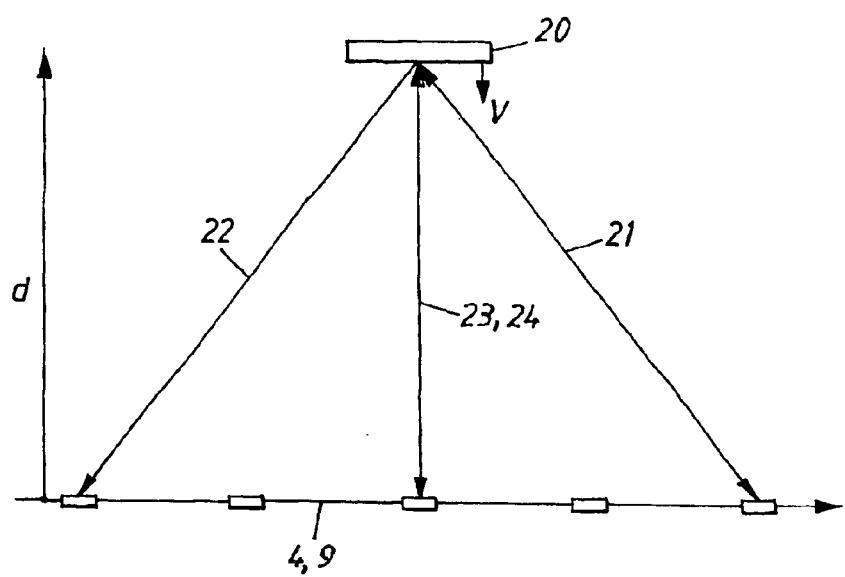

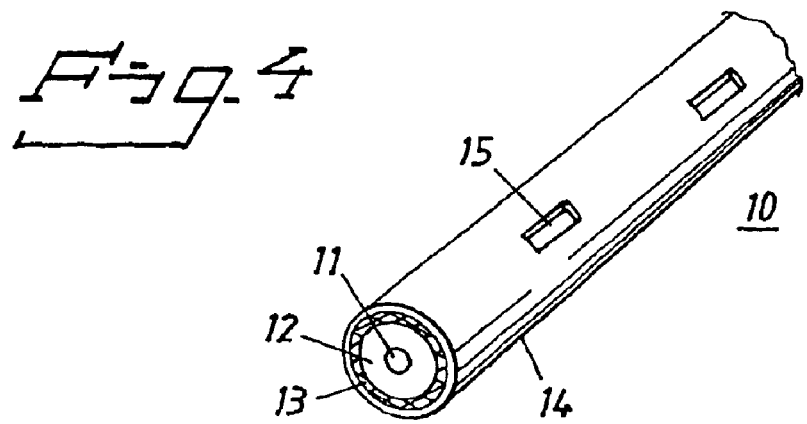
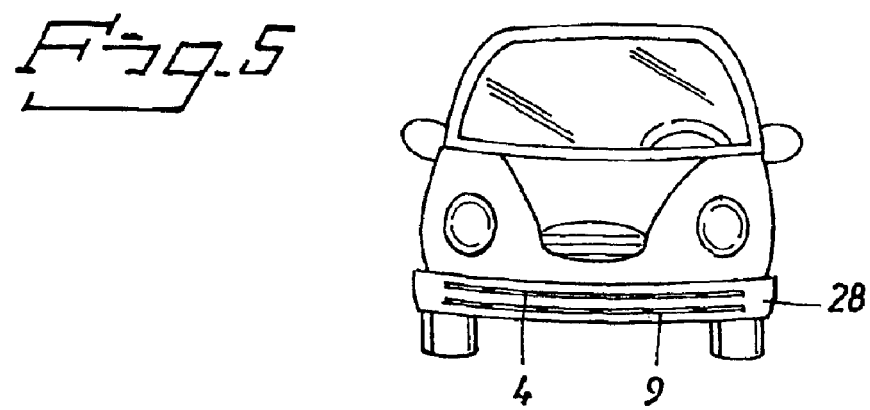
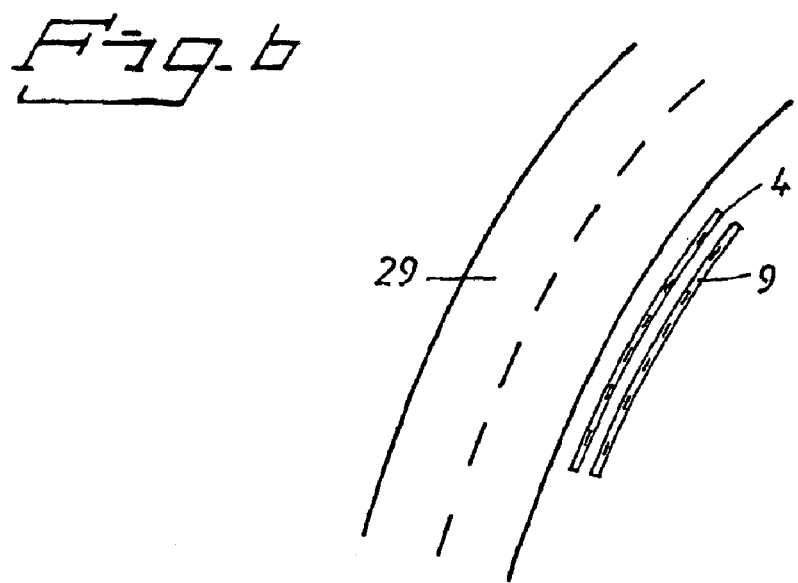

DEVICE FOR MONITORING AN AREA

The present invention relates to a device for monitoring an area, which device comprises a transmitter unit for transmitting a signal and a receiver unit for receiving a reflected signal via an antenna, a first slotted cable being arranged as transmitting antenna for the transmission of a pulsed high-frequency signal, a second slotted cable being arranged as receiving antenna for the reception of the reflected signal. The slotted cables are arranged in association with each other and essentially parallel to each other, and the transmitter unit is connected to one end of the first slotted cable and the receiver unit is connected to an end of the second slotted cable that is furthest away from the end of the first slotted cable.

The installation of a monitoring device in the form of an active sensor for monitoring an area in front of a vehicle is already known. The sensor has a poor range and the radiation from the sensor in the area that is to be monitored can be regarded as originating from a point source. When the sensor is located in the centre of the front of the vehicle, acceptable values can be obtained for the relative speed between the vehicle and a reflecting object that is centrally in front of the vehicle in the direction of movement of the vehicle. However, if the reflecting object is displaced sideways relative to the direction of movement of the vehicle, an unacceptable error in the speed can easily arise. There is also the risk that the object will leave the sensor's field of vision when there is a short distance between the reflecting object and the vehicle. In order to increase the accuracy when determining speed, it would be possible to install several individual sensors along the front of the vehicle. The use of several sensors with associated arrangement for signal processing and installation means that the monitoring device runs the risk of being both complex and expensive.

A monitoring device in the form of a security alarm is already known from U.S. Pat. No. 3,947,834. The alarm is provided with a combined transmitting and receiving antenna in the form of a cable with groups of slots. The antenna is supplied at one end with a radar frequency which, when it is reflected from moving objects, gives rise to a Doppler frequency signal which under certain conditions causes the alarm to be activated. The security alarm detects movement but carries out no direct determination of speed or distance. Due to the not insignificant suppression that is introduced along the length of the antenna, the antenna has different sensitivity along its length, with greater sensitivity close to the supply end. In addition, the length of the signal wave varies in the antenna. Reflections close to the supply end of the antenna have a shorter signal wave in the antenna than reflections close to the end of the antenna that is furthest away from the supply end. Among other things, the circumstances described above make it difficult, if not impossible, to determine the relative speed and distance of an object with any accuracy, if so required.

A device according to the first section of the description is previously known from U.S. Pat. No. 4,612,536. In this case a security alarm is again in question. The intrusion detector of the security alarm here comprises two parallel antenna cables preferably located in the ground in connection to an object to be protected. The antenna cables are in opposite ends connected to a transmitter unit and a receiver unit, respectively and the asymmetry occurring in the transmitter antenna lobe due to attenuation along the cable will be balanced out of a corresponding reversed asymmetry in the antenna lobe of the receiver antenna. The intention is to detect objects if any passing above the antenna cables and if desired to determine the location of the passage. However, there is no determining of the speed of an object approaching the object to be protected.

The object of the present invention is to achieve a monitoring device that does not have the abovementioned limitations, is simple in design and can be produced and installed at a low cost. The object of the invention is achieved by means of a monitoring device characterized in that the relative speed between the monitoring device and a reflecting object is determined by utilizing the Doppler principle, a mixer being arranged with one input connected to the transmitting antenna and the other input connected to the receiving antenna, which mixer generates at its output the difference frequency between the transmitted signal and received signal. The monitoring device according to the invention has, in addition, the advantage of being able to function independent of the cable length of the antennas.

According to an advantageous embodiment of the monitoring device according to the invention, a delay is introduced between the transmitting antenna and the receiver unit. By this means, the area that is to be monitored can be moved out from the antennas and the monitoring area can be adapted to suit the application concerned. In a simple embodiment, the delay is carried out by a coaxial cable. A delaying device designed to be able to vary the delay can advantageously also be introduced. A monitoring device with the ability to vary the delay has the advantage that the monitoring area can be moved. It is thereby possible to monitor a larger area.

According to an advantageous further development of the monitoring device, a processor is arranged to identify the highest Doppler frequency and base the determining of the relative speed upon that. Suitably the processor is arranged to apply a Fourier transform to the generated difference signal and to identify the highest Doppler frequency from the generated Fourier-transformed signal.

According to another advantageous further development of the monitoring device, the transmitter unit and the receiver unit each comprise an interacting switch, whereby reflections from objects outside the monitored area can be excluded by means of the interaction of the switches. Radiation reflected from an object immediately outside the monitoring area is stopped by the receiver unit's switch which assumes an open, non-transmitting position when the radiation reaches the receiving antenna. In this way, reflections from large reflecting objects outside the monitored area are stopped in a very efficient way.

The slotted cable of the transmitting antenna and the receiving antenna consists advantageously of a slotted coaxial cable. A suitable number of slots can be four to six per metre of cable. For example, in a suitable embodiment for mounting on a vehicle, the first and the second slotted cables each comprise 3–20 slots, distributed along the length of the cable.

In order to determine the distance between the monitoring device and a reflected target, a means is advantageously arranged for measuring the delay time interval of a reflected pulse.

In the following, the invention will be described in greater detail in exemplified form with reference to the attached figures, in which:

FIG. 1 shows schematically an example of a monitoring device according to the invention.

FIG. 2a shows schematically the antenna beam of a transmitting antenna incorporated in the monitoring device.

FIG. 2b shows schematically the antenna beam of a receiving antenna incorporated in the monitoring device.

FIG. 2c shows the resulting antenna beam comprising the antenna beam of the transmitting antenna according to FIG. 2a and the antenna beam of the receiving antenna according to FIG. 2b.

FIG. 3 illustrates a number of examples of reflections between the monitoring device and a reflecting object.

FIG. 4 shows schematically an example of a slotted coaxial cable.

FIG. 5 shows schematically the monitoring device according to the invention mounted on a vehicle.

FIG. 6 shows schematically the monitoring device installed in association with a section of road.

The monitoring device 1 shown schematically in FIG. 1 comprises a transmitter unit 2 and a receiver unit 3. The transmitter unit is connected to a mixer 5 in the receiver unit 3 via a transmitting antenna 4. A delaying device 16 in the form of a coaxial cable is connected between the transmitting antenna 4 and the receiver unit 3. The transmitter unit comprises an oscillator 6 and a switch 7. A receiving antenna 9 is connected to the mixer 5, the output of which is connected to a switch 8. The switch is in turn connected to a threshold detector 26 and a processor 25. The mixer 5, the switch 8, the processor 25 and the threshold detector 26 are regarded as being part of the receiver unit 3. The transmitting antenna and the receiving antenna consist of slotted cables and preferably slotted coaxial cables.

An example of a slotted coaxial cable is shown in FIG. 4. The cable 10 comprises a central conductor 11 surrounded by an insulating layer 12. On the outside surface of the insulating layer 12 there is a conductive screen 13 covered by an outer insulating layer 14. Slots 15 are arranged along the longitudinal direction of the coaxial cable, preferably at regular intervals. The slots are achieved by creating openings in the conductive screen by removing parts of the screen or by pushing the screening material aside. The shape of the openings can vary, depending among other things upon the frequency range concerned and the required beam shape.

In the embodiment shown in FIG. 1, the transmitting antenna 4 and the receiving antenna 9 have each been provided with five slots, 4.1, 4.2, 4.3, 4.4, 4.5 and 9.1, 9.2, 9.3, 9.4, 9.5 respectively. A suitable number can, for example, be from three up to 20 slots and preferably four to six slots per metre, depending among other things upon the frequency concerned. The slots behave essentially as dipole antennas.

During operation, the oscillator 6 emits a high-frequency signal that the switch 7 converts into a pulsed high-frequency signal, which is fed into the transmitting antenna 4. In order to reduce the bandwidth, the pulses are given a relatively large pulse length. FIG. 2a shows schematically a continuous area 17 for the transmitting antenna 4 where the signal strength exceeds a particular value. Due to suppression along the transmitting antenna, the area 17 will be asymmetrical, with a larger range at the input side of the transmitting antenna. The area constitutes the transmitting antenna's combined asymmetrical antenna beams. In a corresponding way, an asymmetrical area 18 is also obtained for the receiving antenna 9, see FIG. 2b. In this asymmetry, the area has a larger range on the receiver side. In ideal conditions with identical slotted cables as antennas, the asymmetrical area 18 is the inverse of the asymmetrical area 17. FIG. 2c shows how the asymmetrical areas of the transmitting antenna 4 and the receiving antenna 9 interact and create an essentially symmetrical area 19.

In the mixer 5, a version of the signal that is transmitted by the transmitting antenna 4 delayed by the delaying device 16 is combined with a reflected signal received by the receiving antenna. At the output of the mixer difference frequencies are obtained, caused by the Doppler effect that arises with reflections from an object when the object is moving in relation to the monitoring device. The further processing of the difference signal is described in greater detail below in connection with the description of FIG. 3. The switch 8 is controlled based on the condition of the switch 7, so that the monitoring area is limited in distance. Strongly reflecting objects at a great distance can thus be excluded and the subsequent signal processing can be made easier.

FIG. 3 illustrates a number of paths of propagation between the transmitting antenna 4 and the receiving antenna 5 via a reflecting object 20. The transmitting antenna and the receiving antenna have been shown with five slots each, 4.1–4.5 and 9.1–9.5 respectively. An example of the longest occurring path of propagation is indicated by the path of propagation along lines 21 and 22. The slot 4.5 of the transmitting antenna 4 transmits a signal that is reflected by the reflector 20 before it reaches the slot 9.1 of the receiving antenna. The lines 23, 24 indicate the shortest path of propagation. In this case the signal is transmitted from the slot 4.3 and is received in the slot 9.3 after being reflected by the reflector 20. This latter path of propagation indicated by the lines 23 and 24 corresponds in principle to twice the actual distance from the monitoring device 1 to the reflecting object 20. By studying the geometry in FIG. 3, a number of additional paths of propagation can be identified. These additional paths of propagation have a delay time interval between the two paths of propagation discussed above.

In order to identify the actual distance d, a Fourier transform can suitably be applied to the difference signal emitted by the mixer 5 according to FIG. 1, for example an FFT transform. The transform can be applied by the processor 25, which can also be used to identify the highest frequency from the Fourier-transformed signal, which highest frequency corresponds to the path of propagation according to the lines 23 and 24. The threshold detector 26 is used in order to prevent minor interference. In order to determine the distance to the object, there is a means for measuring the delay time interval of a reflected pulse. The processor 25 can be used for this measurement.

FIG. 5 shows the front of a vehicle which has been provided with a monitoring device according to the invention. The slotted coaxial cables of the transmitting antenna 4 and the receiving antenna 9 have been mounted in or on the vehicle's bumper 28 in the longitudinal direction of the bumper. The internal space of the vehicle, for example the engine compartment or the passenger compartment, can be used to house other parts comprised in the monitoring system.

FIG. 6 shows another application. The transmitting antenna 4 and receiving antenna 9 of the monitoring device have been installed along a road. By road is not only meant here a vehicular road, but also for example a railroad. According to the embodiment shown in FIG. 6, a transmitting antenna 4 and a receiving antenna 9 are installed along a section of road 29 close to the edge of the road. In the embodiment shown, the transmitting antenna and the receiving antenna are shaped to follow the shape of the road, which is here somewhat curved. In principle, the antennas 4, 9 can be laid directly on the ground. It is, however, also possible to fix the antennas in some other way, for example, to some form of road barrier.

The invention is not restricted to the embodiments described above, but can be modified within the scope of the following patent claims and invention concept. For example, there is a plurality of possible applications in addition to the ones described above.

What is claimed is:

1. Device for monitoring an area, which device comprises a transmitter unit for transmitting a signal and a receiver unit for receiving a reflected signal via an antenna, a first slotted cable being arranged as transmitting antenna for the transmission of a high-frequency signal and a second slotted cable being arranged as receiving antenna for the reception of the reflected signal, the slotted cables being arranged in association with each other and essentially parallel to each other, and the transmitter unit being connected to one end of the first slotted cable, a delaying device connected between the first slotted cable and the receiver unit, and the receiver unit being connected to the end of the second slotted cable furthest away from that end of the first slotted cable, characterized in that the relative speed between the monitoring device and a reflecting object is determined by utilizing the Doppler principle, a mixer being arranged with one input connected to the transmitting antenna and the other input connected to the receiving antenna, which mixer generates at its output the difference frequency between the transmitted signal and received signal.

2. Device according to claim 1, characterized in that a processor is arranged to identify the highest Doppler frequency and base the determining of the relative speed upon that.

3. Device according to claim 1, characterized in that the delaying device is preferably in the form of a coaxial cable.

4. Device according to claim 1, characterized in that the transmitter unit and the receiver unit each comprise an interacting switch, whereby reflections from objects outside the monitored area can be excluded by means of the interaction of the switches.

5. Device according to claim 1, characterized in that the first and second slotted cables consist of a coaxial cable.

6. Device according to claim 1, characterized in that the first and second slotted cables are designed with four to six plots per meter.

7. Device according to claim 1, characterized in that the first and the second slotted cables each comprise 3–20 slots, distributed along the length of the cable.

8. Device according to claim 1, characterized in that a means is arranged for measuring the time delay interval of a reflected pulse to determine the distance between the monitoring device and a reflecting target.

9. Device according to claim 2, characterized, the processor is arranged to apply a Fourier transform to the generated difference signal and from the Fourier-transformed signal identify the highest Doppler frequency.

10. Device according to claim 2, characterized in that a delaying device, preferably in the form of a coaxial cable, is inserted between the transmitting antenna and the receiver unit.

11. Device according to claim 2, characterized in that the transmitter unit and the receiver unit each comprise an interacting switch, whereby reflections from objects outside the monitored area can be excluded by means of the interaction of the switches.

12. Device according to claim 2, characterized in that the first and second slotted cables consist of a coaxial cable.

13. Device according to claim 3, characterized in that the delaying device is designed to be able to vary the delay.

14. Device according to claim 3, characterized in that the transmitter unit and the receiver unit each comprise an interacting switch, whereby reflections from objects outside the monitored area can be excluded by means of the interaction of the switches.

15. Device according to claim 3, characterized in that the first and second slotted cables consist of a coaxial cable.

16. Device according to claim 9, characterized in that a delaying device, preferably in the form of a coaxial cable, is inserted between the transmitting antenna and the receiver unit.

17. Device according to claim 9, characterized in that the transmitter unit and the receiver unit each comprise an interacting switch, whereby reflections from objects outside the monitored area can be excluded by means of the interaction of the switches.

18. Device according to claim 9, characterized in that the first and second slotted cables consist of a coaxial cable.

19. Device according to claim 13, characterized in that the transmitter unit and the receiver unit each comprise an interacting switch, whereby reflections from objects outside the monitored area can be excluded by means of the interaction of the switches.

20. Device according to claim 13, characterized in that the first and second slotted cables consist of a coaxial cable.

* * * * *